US011463838B2

(12) United States Patent
Niemiec et al.

(10) Patent No.: US 11,463,838 B2
(45) Date of Patent: Oct. 4, 2022

(54) METHOD TO SHARE INFORMATION BETWEEN PROXIMAL MOBILE DEVICES

(71) Applicants: MOTOROLA SOLUTIONS, INC., Chicago, IL (US); Pawel Niemiec, Rzeszow (PL); Michal Hojwa, Cracow (PL); Tetiana Begma, Cracow (PL); Andrzej A. Amghar, Cracow (PL); Robert Orzechowski, Cracow (PL); Mariusz Wawrowski, Wawrzenczyce (PL); Pawel Krupa, Niepolomice (PL); Wojciech Michalik, Cracow (PL)

(72) Inventors: Pawel Niemiec, Rzeszow (PL); Michal Hojwa, Cracow (PL); Tetiana Begma, Cracow (PL); Andrzej A. Amghar, Cracow (PL); Robert Orzechowski, Cracow (PL); Mariusz Wawrowski, Wawrzenczyce (PL); Pawel Krupa, Niepolomice (PL); Wojciech Michalik, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/642,170

(22) PCT Filed: Dec. 21, 2017

(86) PCT No.: PCT/PL2017/050069
§ 371 (c)(1),
(2) Date: Feb. 26, 2020

(87) PCT Pub. No.: WO2019/125193
PCT Pub. Date: Jun. 27, 2019

(65) Prior Publication Data
US 2021/0084433 A1 Mar. 18, 2021

(51) Int. Cl.
*H04W 4/021* (2018.01)
*H04L 51/222* (2022.01)
(Continued)

(52) U.S. Cl.
CPC ............ *H04W 4/021* (2013.01); *G06Q 30/02* (2013.01); *H04L 51/222* (2022.05); *H04L 67/306* (2013.01); *H04W 84/18* (2013.01)

(58) Field of Classification Search
CPC ...... H04W 4/021; H04W 84/18; G06Q 30/02; H04L 51/20; H04L 67/306
See application file for complete search history.

(56) References Cited

U.S. PATENT DOCUMENTS

| | | | |
|---|---|---|---|
| 7,478,126 B2 * | 1/2009 | Prohel | H04L 67/306 709/227 |
| 8,352,546 B1 | 1/2013 | Dollard | |

(Continued)

OTHER PUBLICATIONS

International Search Report and the Written Opinion corresponding patent application No. PCT/PL2017/050069 filed Dec. 21, 2017, dated Jul. 31, 2018, all pages.

*Primary Examiner* — Soe Hlaing

(57) ABSTRACT

A method is provided that provides information exchange between mobile devices that are near each other. Upon determining that a first mobile device is located near a second mobile device, information is exchanged between a first virtual personal assistant associated with the first mobile device and a second virtual personal assistant associated with the second mobile device. The information is compared to identify an overlapping topic in the information. If there is overlapping information, the users of the mobile devices are alerted to the overlapping topic.

20 Claims, 4 Drawing Sheets

(51) Int. Cl.
*G06Q 30/02* (2012.01)
*H04L 67/306* (2022.01)
*H04W 84/18* (2009.01)

(56) References Cited

U.S. PATENT DOCUMENTS

| | | |
|---|---|---|
| 8,831,640 B2 | 9/2014 | Trinchero et al. |
| 2008/0089298 A1 | 4/2008 | Anschutz et al. |
| 2010/0217660 A1* | 8/2010 | Biswas .................. G06Q 30/02 705/14.38 |
| 2011/0209221 A1* | 8/2011 | Hanson .................. H04W 4/60 709/227 |
| 2012/0157157 A1* | 6/2012 | Chakra ............. H04M 1/72412 455/550.1 |
| 2013/0337771 A1 | 12/2013 | Klein et al. |
| 2014/0101243 A1* | 4/2014 | Naveh ................. G06F 16/9535 709/204 |
| 2015/0213091 A1* | 7/2015 | Laight .................... H04L 51/32 707/758 |
| 2016/0284199 A1* | 9/2016 | Dotan-Cohen ........ G08B 21/24 |

* cited by examiner

METHOD TO SHARE INFORMATION BETWEEN PROXIMAL MOBILE DEVICES

BACKGROUND OF THE INVENTION

Information is vital for public safety officers. Oftentimes a first public safety officer has information that a second public safety officer would find useful, but the first public safety officer does not know that the second public safety officer could use this information.

Privacy is also an important concern, especially for public safety officers. Many public safety officers are willing to share some information that is stored on any of their devices or accounts, but are unwilling to allow others to have unlimited access to their personal devices or accounts.

Therefore, a need exists for a way to allow a public safety officer to share information with other public safety officers to share relevant information with other public safety officers without allowing the first public safety officer to have to share all of their information, especially personal information.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
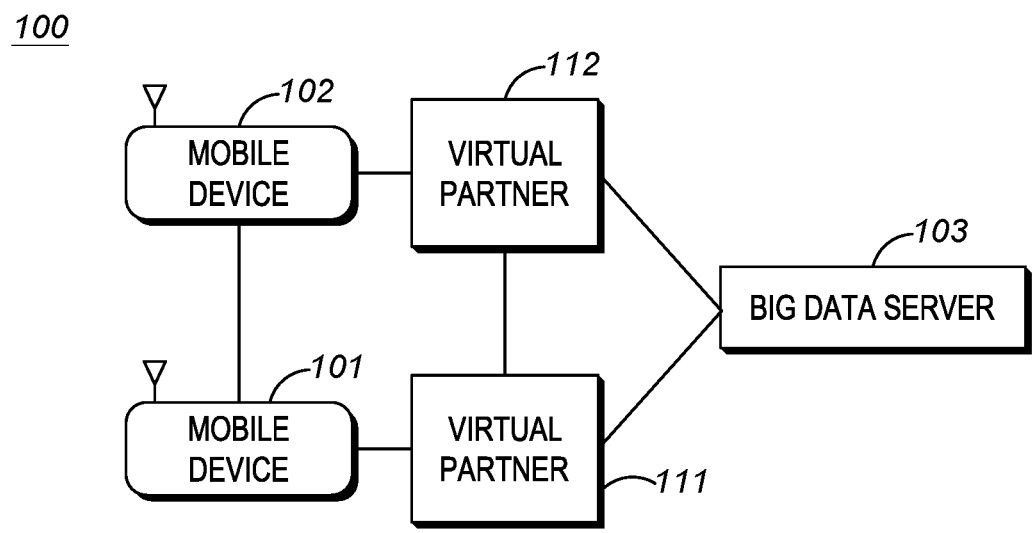
FIG. 1 depicts a system diagram of a communication system in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

FIG. 1 depicts a system diagram of a communication system 100 in accordance with an exemplary embodiment of the present invention. Communication system 100 includes mobile device 101, mobile device 102, Big Data Server 103, virtual partner 111, and virtual partner 112.

Mobile devices 101 and 102 are electronic devices that can send and receive data and voice communications. Mobile devices 101 and 102 can be cell phones, subscribers, car radios, personal digital assistants, land mobile radios, or any device that is capable of sending and receiving voice, data, or both. It should be understood that a typical communication system would include hundreds and even thousands of electronic devices, but only two are depicted in FIG. 1 for clarity. It should also be understood that each user can have one or more of each type of device. For example, a public safety officer may have two mobile devices, one vehicular device, and two personal computers, all at the same time.

Big Data Server 103 is a computer, device, datacenter, or processor in the cloud that provides computation for communication system 100. Big data server 103 is operably coupled to virtual partner 111 and virtual partner 112 and preferably includes at least one input/output port, memory, and a processor. The processor is effective in receiving inputs and performing calculations and returning the results of these calculations, via the input/output ports, to the requesting user.

Virtual partners 111 and 112 are Virtual Personal Assistants (VPAs). Virtual partners 111 and 112 preferably exchange information, such as events, topics, places, and timelines. In a first exemplary embodiment, the information is compared at big data server 103. In a second exemplary embodiment, the information is compared locally.

In accordance with an exemplary embodiment, virtual partners 111 and 112 communicate with each other, either via an ad-hoc network or via direct-to-direct communication. This preferably occurs when mobile devices 101 and 102 are proximate to each other.

Virtual partners 111 and 112 preferably send queries to a database, in this case one located within big data server 103. These requests preferably include top topics related to a user of mobile device 101 with an extension including the name and ID of the user of mobile device 102. Mobile devices 101 and 102 are preferably in proximity to each other when this request relating to the common topics is sent.

In this manner, the virtual partners suggests topics to discuss between users, such as events, timelines, and places, without revealing any information from the other user. As a result there is a significant reduction of time to get to the point and exchange information between public safety officers in an efficient manner.

Figure 2:
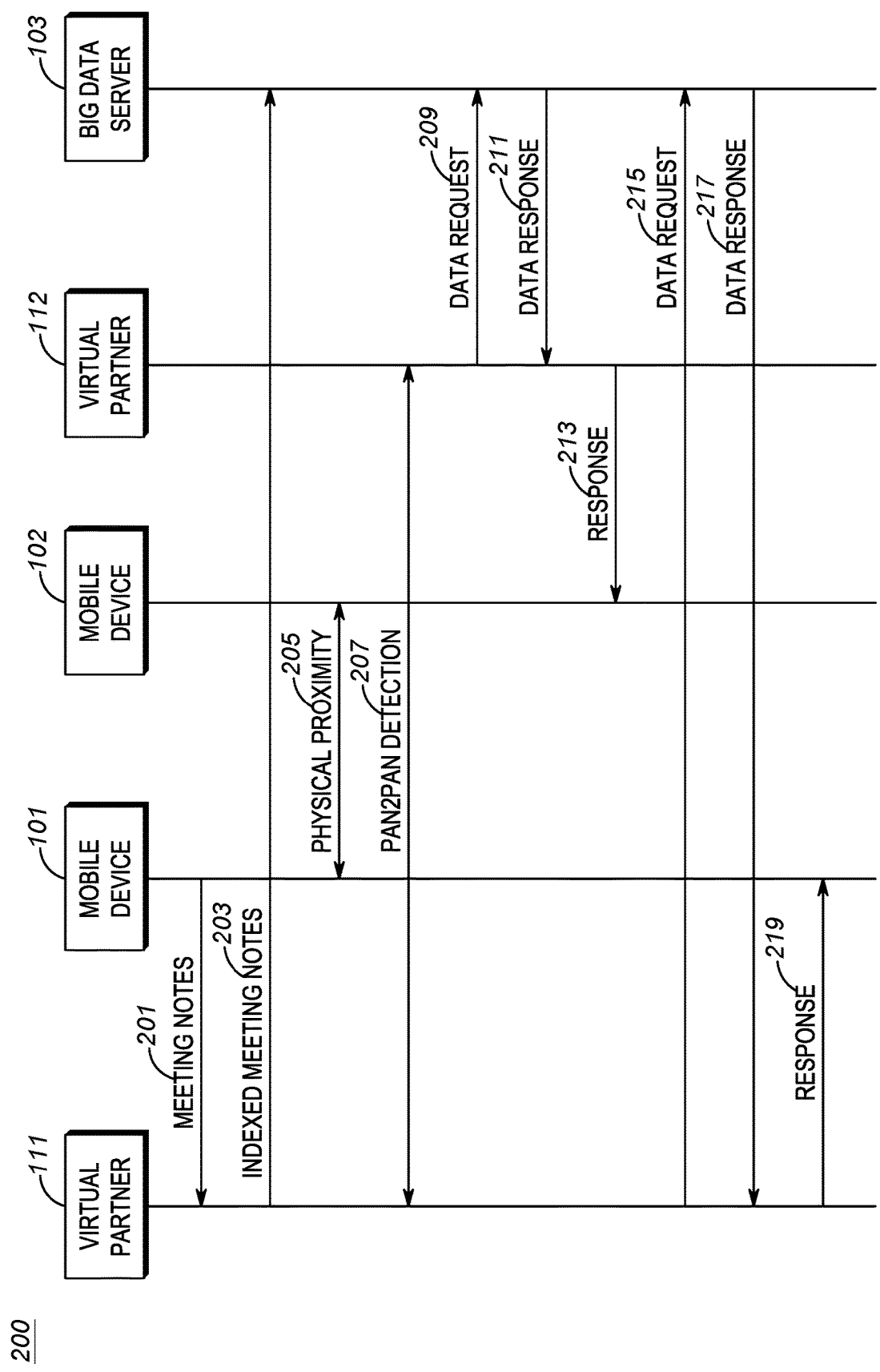
FIG. 2 depicts a call flow diagram in accordance with a first exemplary embodiment of the present invention.

FIG. 2 depicts a call flow diagram 200 in accordance with a first exemplary embodiment of the present invention. In the exemplary embodiment depicted in FIG. 2, analysis is performed at big data server 103.

Mobile device 101 sends meeting notes 201 to virtual partner 111. In accordance with an exemplary embodiment, a PAN associated with virtual partner 111 processes the information in meeting notes 201 and produces a set of indexed meeting notes.

Virtual Partner 111 sends indexed meeting notes 203 to Big Data Server 103. Big Data Server 103 stores the indexed meeting notes in a way in which the meeting notes are searchable and easily retrievable. For example, Virtual Partner 111 can include an incident number with the indexed meeting notes so that a user can search on the incident number to find a meeting note.

At some point, mobile devices 101 and 102 determine (205) that they are in physical proximity to each other. In accordance with an exemplary embodiment, mobile devices 101 and 102 determine that they are in physical proximity to each other when virtual partners 111 and 112 are able to communicate with each other. This can happen via an ad-hoc network or via direct-to-direct communication.

Upon determining that they are in close physical proximity, virtual partners 111 and 112 communicate with each other, at Pan2Pan Detection step 207.

Virtual Partner 112 sends Data Request message 209 to Big Data Server 103. Data Request message 209 preferably includes an identification of the requestor, in this exemplary embodiment mobile device 102, and an identification of the proximate mobile device, in this exemplary embodiment mobile device 101.

In accordance with an exemplary embodiment, big data server 103 performs analysis to extract data relating to both mobile device 101 and mobile device 102. Big data server 103 preferably ensures that mobile device 102 has the appropriate security settings to access the data pertaining to mobile device 101.

Once the access is approved at big data server 103, Big Data Server 103 sends Data Response message 211 to Virtual Partner 112. Data Response message 211 preferably includes information that is overlapping between mobile device 102 and mobile device 101. For example, any incidents that both mobile devices have in common, any locations they both have been at, and any overlapping information in their timelines that shows that they may have information that is helpful to the other mobile device.

Virtual Partner 112 sends Response 213 to Mobile Device 102, and the information in response 213 is made available to mobile device 102 and the user of mobile device 102.

Virtual Partner 111 sends Data Request message 215 to Big Data Server 103. Data Request message 215 preferably includes an identification of the requestor, in this exemplary embodiment mobile device 101, and an identification of the proximate mobile device, in this exemplary embodiment mobile device 102.

In accordance with an exemplary embodiment, big data server 103 performs analysis to extract data relating to both mobile device 101 and mobile device 102. Big data server 103 preferably ensures that mobile device 101 has the appropriate security settings to access the data pertaining to mobile device 102.

Once the access is approved at big data server 103, Big Data Server 103 sends Data Response message 217 to Virtual Partner 111. Data Response message 217 preferably includes information that is overlapping between mobile device 101 and mobile device 102. For example, any incidents that both mobile devices have in common, any locations they both have been at, and any overlapping information in their timelines that shows that they may have information that is helpful to the other mobile device.

Virtual Partner 111 sends Response 219 to Mobile Device 101, and the information in response 219 is made available to mobile device 101 and the user of mobile device 101.

In accordance with an exemplary embodiment, knowledge of this information allows users of mobile devices 101 and 102 to ask each other about any overlapping incidents. This is extremely helpful in the public safety domain, since public safety officers often do not have extensive knowledge of every other incident other public safety officers has experience with. This also allows this information to be kept appropriately private, since checks are done at big data server 103 to ensure that those receiving the information have the appropriate permissions to receive this information.

Figure 3:
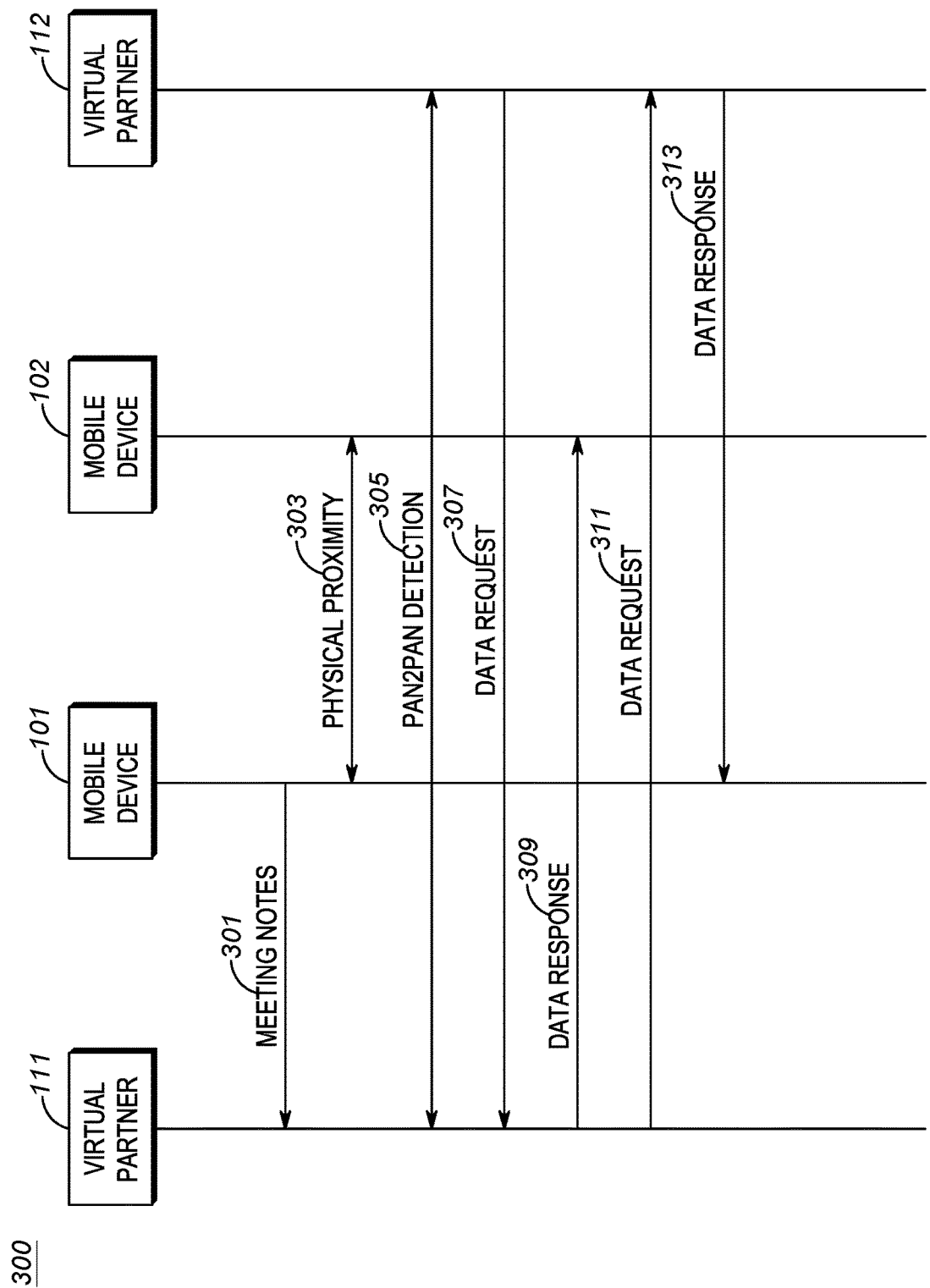
FIG. 3 depicts a call flow diagram in accordance with a second exemplary embodiment of the present invention.

FIG. 3 depicts a call flow diagram 300 in accordance with a second exemplary embodiment of the present invention. In the exemplary embodiment depicted in FIG. 3, analysis is performed locally without access of a big data server.

Mobile device 101 sends meeting notes 301 to virtual partner 111. In accordance with an exemplary embodiment, a PAN associated with virtual partner 111 processes the information in meeting notes 301 and produces and stores a set of indexed meeting notes. Virtual partner 111 preferably stores the indexed meeting notes in a way in which the meeting notes are searchable and easily retrievable.

At some point, mobile devices 101 and 102 determine (303) that they are in physical proximity to each other. In accordance with an exemplary embodiment, mobile devices 101 and 102 determine that they are in physical proximity to each other when virtual partners 111 and 112 are able to communicate with each other. This can happen via an ad-hoc network or via direct-to-direct communication.

Upon determining that they are in close physical proximity, virtual partners 111 and 112 communicate with each other, at Pan2Pan Detection step 305.

Virtual Partner 112 sends Data Request message 307 to Virtual Partner 111. Data Request message 307 preferably includes an identification of the requestor, mobile device 102. In accordance with an exemplary embodiment, Virtual Partner 111 performs analysis to extract data relating to both mobile device 101 and mobile device 102. Virtual Partner 111 preferably ensures that mobile device 102 and Virtual Partner 112 have the appropriate security settings to access the data pertaining to mobile device 101.

Once the access is approved at Virtual Partner 111, Virtual Partner 111 sends Data Response message 309 to Mobile Device 102. Data Response message 309 preferably includes information that is overlapping between mobile device 102 and mobile device 101. For example, any incidents that both mobile devices have in common, any locations they both have been at, and any overlapping information in their timelines that shows that they may have information that is helpful to the other mobile device. The information in Data Response message 309 is made available to mobile device 102 and the user of mobile device 102.

Virtual Partner 111 sends Data Request message 311 to Virtual Partner 112. Data Request message 311 preferably includes an identification of the requestor, mobile device 101. In accordance with an exemplary embodiment, Virtual Partner 112 performs analysis to extract data relating to both mobile device 101 and mobile device 102. Virtual Partner 112 preferably ensures that mobile device 101 and Virtual Partner 111 has the appropriate security settings to access the data pertaining to mobile device 102.

Once the access is approved at Virtual Partner 112, Virtual Partner 112 sends Data Response message 313 to Mobile Device 101. Data Response message 313 preferably includes information that is overlapping between mobile device 101 and mobile device 102. For example, any incidents that both mobile devices have in common, any locations they both have been at, and any overlapping information in their timelines that shows that they may have information that is helpful to the other mobile device. The information in response 313 is made available to mobile device 101 and the user of mobile device 101.

In accordance with an exemplary embodiment, knowledge of this information allows users of mobile devices 101 and 102 to ask each other about any overlapping incidents. This exemplary embodiment allows mobile devices to exchange data even when a server is not in the network and the mobile devices communicate directly with each other.

Figure 4:
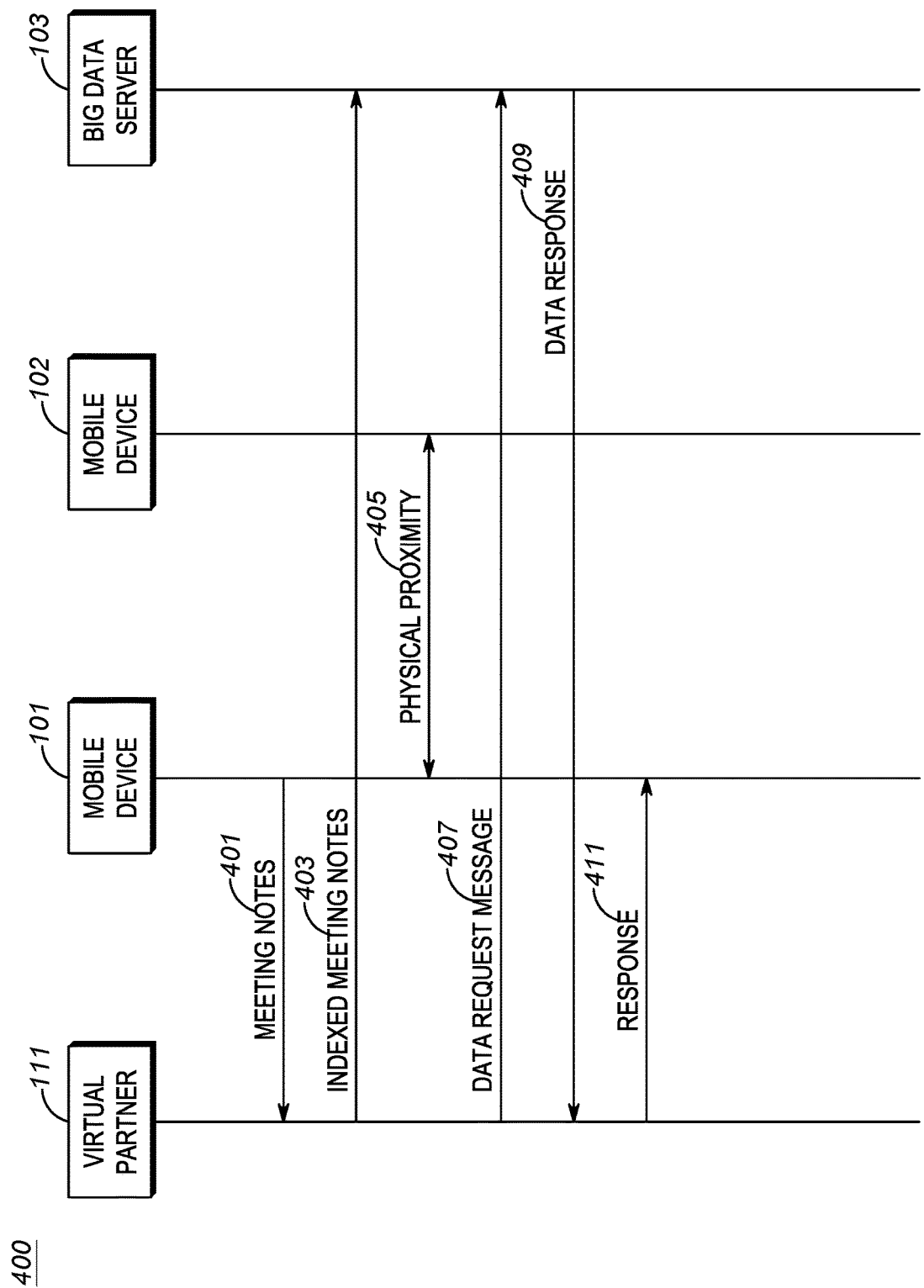
FIG. 4 depicts a call flow diagram in accordance with a third exemplary embodiment of the present invention.

FIG. 4 depicts a call flow diagram in accordance with a third exemplary embodiment of the present invention. In this exemplary embodiment, mobile device 102 does not have an associated virtual partner and therefore cannot form a personal area network. In addition, information about the experiences of mobile device 102 as well as a profile of a user of mobile device 102 is stored in Big Data Server 103, which acts like a remote virtual partner.

Mobile device 101 sends meeting notes 401 to virtual partner 111. In accordance with an exemplary embodiment, a PAN associated with virtual partner 111 processes the information in meeting notes 201 and produces a set of indexed meeting notes.

Virtual Partner 111 sends indexed meeting notes 403 to Big Data Server 103. Big Data Server 103 stores the indexed meeting notes in a way in which the meeting notes are searchable and easily retrievable. For example, Virtual Partner 111 can include an incident number with the indexed meeting notes so that a user can search on the incident number to find a meeting note.

At some point, mobile devices 101 and 102 determine (405) that they are in physical proximity to each other. In this exemplary embodiment, this determination is made based on physical recognition of the other device or a user of the device, such as by a body worn camera or CCTV camera if it detects proximity.

Virtual Partner 111 sends Data Request message 407 to Big Data Server 103. Data Request message 407 preferably includes an identification of the requestor, in this exemplary embodiment mobile device 101, and an identification of the proximate mobile device, in this exemplary embodiment mobile device 102.

In accordance with an exemplary embodiment, big data server 103 performs analysis to extract data relating to both mobile device 101 and mobile device 102. Big data server 103 preferably ensures that mobile device 101 has the appropriate security settings to access the data pertaining to mobile device 102.

Once the access is approved at big data server 103, Big Data Server 103 sends Data Response 409 to Virtual Partner 111. Data Response message 217 preferably includes information that is overlapping between mobile device 101 and mobile device 102. For example, any incidents that both mobile devices have in common, any locations they both have been at, and any overlapping information in their timelines that shows that they may have information that is helpful to the other mobile device.

Virtual Partner 111 sends Response 411 to Mobile Device 101, and the information in response 219 is made available to mobile device 101 and the user of mobile device 101. In accordance with an exemplary embodiment, knowledge of this information allows users of mobile devices 101 and 102 to ask each other about any overlapping incidents, even if they are unaware of their shared knowledge and do not have the ability to form a personal area network. This is extremely helpful in the public safety domain, since public safety officers often do not have extensive knowledge of every other incident other public safety officers has experience with. This also allows this information to be kept appropriately private, since checks are done at big data server 103 to ensure that those receiving the information have the appropriate permissions to receive this information.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    determining that a first mobile device is located within physical proximity to a second mobile device, wherein the determination is made based on physical recognition of the second mobile device by a camera;
    determining there is an overlap in information associated with the first mobile device and the second mobile device, the overlap in information identifying an overlapping topic;
    exchanging information between the first virtual personal assistant associated with the first mobile device and the second virtual personal assistant associated with the second mobile device based on the determination of the overlap in information, wherein exchanging information occurs after the second virtual assistant has ensured the first mobile device has appropriate security settings to access data pertaining to the second mobile device and the first virtual assistant has ensured the second mobile device has appropriate security settings to access data pertaining to the first mobile device; and
    alerting one of the users of the overlapping topic.

2. The method of claim 1, wherein the step of exchanging information comprises sending a query to a database including a topic.

3. The method of claim 1, wherein the step of exchanging information comprises exchanging information over an ad-hoc network.

4. The method of claim 1, wherein the step of exchanging information comprises exchanging information via direct communication between the first mobile device and the second mobile device.

5. The method of claim 1, wherein the overlapping topic comprises a predetermined event.

6. The method of claim 1, wherein the overlapping topic comprises a timeline.

7. The method of claim 1, wherein the overlapping topic comprises a predetermined place.

8. The method of claim 1, wherein the step of alerting one of the users of the overlapping topic comprises alerting one of the users of the overlapping topic without revealing any personal information related to the other user.

9. The method of claim 1, wherein the overlapping topic comprises a priority level.

10. The method of claim 1, wherein the step of alerting one of the users of the overlapping topic comprises alerting via a text message.

11. The method of claim 1, wherein the step of alerting one of the users of the overlapping topic comprises alerting via an audio message.

12. The method of claim 1, wherein the step of alerting one of the users of the overlapping topic comprises alerting via visual augmentation.

13. A method comprising:
    capturing a meeting note from a first virtual personal assistant associated with a first public safety officer;
    determining that the first public safety officer is within physical proximity to a second public safety officer, wherein the first public safety offer is within physical proximity to the second public safety officer when the first virtual assistant associated with the first public safety officer is able to communicate with a second virtual personal assistant associated with the second public safety officer;
    sharing information between the first virtual personal assistant and the second virtual personal assistant associated with the second public safety officer;
    retrieving data by the first public safety officer relating to the second public safety officer, wherein the data related to the second public safety officer includes information that is overlapping between a mobile device associated with the first public safety officer and a mobile device associated with the second public safety officer;
    retrieving data by the second public safety officer relating to the first public safety officer, wherein the data related to the first public safety officer includes information that is overlapping between the mobile device associated with the second public safety officer and the mobile device associated with the first public safety officer;
    determining if the data relating to the second public safety officer is related to the meeting note;
    alerting the first public safety officer that the second public safety officer has data related to the meeting note; and
    alerting the second public safety officer of the meeting note.

14. The method of claim 13, wherein the step of alerting the first public safety officer that the second public safety officer has data related to the meeting note comprises alerting the first public safety officer that the second public safety officer has data related to the meeting note over an ad-hoc network.

15. The method of claim 13, wherein the step of alerting the first public safety officer that the second public safety officer has data related to the meeting note comprises alerting the first public safety officer that the second public safety officer has data related to the meeting note via direct communication between the first mobile device and the second mobile device.

16. The method of claim 13, wherein the step of determining if the data relating to the second public safety officer is related to the meeting note comprises determining if the data relating to the second public safety officer is related to a predetermined event.

17. The method of claim 13, wherein the step of determining if the data relating to the second public safety officer is related to the meeting note comprises determining if the data relating to the second public safety officer comprises a predetermined place.

18. The method of claim 13, wherein the step of alerting the first public safety officer that the second public safety officer has data related to the meeting note comprises alerting the first public safety officer that the second public safety officer has data related to the meeting note without revealing any personal information related to the second public safety officer.

19. The method of claim 13, wherein the step of alerting the first public safety officer that the second public safety officer has data related to the meeting note comprises alerting the first public safety officer that the second public safety officer has data related to the meeting note via a text message.

20. The method of claim 13, wherein the step of alerting the first public safety officer that the second public safety officer has data related to the meeting note comprises alerting the first public safety officer that the second public safety officer has data related to the meeting note via an audio message.

\* \* \* \* \*